(12) United States Patent
Dudar (10) Patent No.: US 10,857,892 B2
(45) Date of Patent: Dec. 8, 2020

(54) SOLAR VEHICLE CHARGING SYSTEM AND METHOD

(71) Applicant: Ford Global Technologies, LLC, Dearborn, MI (US)

(72) Inventor: Aed M. Dudar, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 472 days.

(21) Appl. No.: 15/707,754

(22) Filed: Sep. 18, 2017

(65) Prior Publication Data

US 2019/0084427 A1    Mar. 21, 2019

(51) Int. Cl.
| | |
|---|---|
| *H01M 10/44* | (2006.01) |
| *H01M 10/46* | (2006.01) |
| *B60L 8/00* | (2006.01) |
| *B60L 53/30* | (2019.01) |
| *B60L 1/00* | (2006.01) |
| *B60L 58/13* | (2019.01) |
| *H02S 40/38* | (2014.01) |

(52) U.S. Cl.
CPC .............. *B60L 8/003* (2013.01); *B60L 1/00* (2013.01); *B60L 53/30* (2019.02); *B60L 58/13* (2019.02); *H01M 10/465* (2013.01); *H02S 40/38* (2014.12); *B60L 2240/622* (2013.01); *B60L 2240/665* (2013.01); *B60L 2260/22* (2013.01); *B60L 2260/32* (2013.01); *Y02T 10/70* (2013.01); *Y02T 10/7072* (2013.01)

(58) Field of Classification Search
CPC .......... H02J 7/35; H02J 7/355; H02J 7/00714; H02J 7/0047; B60L 2260/32; B60L 8/003; B60L 2240/665; B60L 2240/622
USPC ................................. 320/101, 104, 132, 109
See application file for complete search history.

(56) References Cited

U.S. PATENT DOCUMENTS

| | | | |
|---|---|---|---|
| 6,620,023 | B2 | 9/2003 | Yeung |
| 7,614,397 | B1 | 11/2009 | Munson, Jr. |
| 8,701,800 | B2 | 4/2014 | Hui et al. |
| 9,300,169 | B1 | 3/2016 | Bardy |
| 9,440,546 | B2 | 9/2016 | Bell et al. |
| 2017/0176575 | A1* | 6/2017 | Smits ................. G01S 7/484 |

FOREIGN PATENT DOCUMENTS

| | | |
|---|---|---|
| DE | 4110819 A1 | 9/1991 |
| JP | H0686406 A | 3/1994 |

* cited by examiner

*Primary Examiner* — Edward Tso
(74) *Attorney, Agent, or Firm* — Frank A. MacKenzie; Bejin Bieneman PLC (57) ABSTRACT

A system includes processor. The system includes a memory, the memory storing instructions executable by the processor to identify, in a vehicle at a first location, a second location receiving reflected light. The memory stores instructions executable by the processor to navigate the vehicle from the first location to the second location receiving the reflected light.

20 Claims, 3 Drawing Sheets

SOLAR VEHICLE CHARGING SYSTEM AND METHOD

BACKGROUND

Vehicles that utilize electricity for their operation may include one or more solar panels for generating such electricity from light received by the solar panels. An amount of electricity generated by the solar panels is proportional to an amount of light received by the solar panels. However, it is a problem that a vehicle (i.e., its solar panel(s)) may not be exposed to light or is exposed in a light but in a manner such that collection of light is inefficient or ineffective to recharge vehicle batteries.

DETAILED DESCRIPTION

Introduction

A system includes processor. The system includes a memory, the memory storing instructions executable by the processor to identify, in a vehicle at a first location, a second location receiving reflected light. The memory stores instructions executable by the processor to navigate the vehicle from the first location to the second location receiving the reflected light.

The memory may further store instructions executable by the processor to identify the second location receiving the reflected light based on a location of a building.

The memory may further store instructions executable by the processor to identify the location of the building based on data from a sensor supported by the vehicle.

The memory may further store instructions executable by the processor to identify the second location receiving the reflected light based on an orientation of an exterior surface of the building.

The memory may further store instructions executable by the processor to identify the second location receiving the reflected light based on a time of day.

The memory may further store instructions executable by the processor to identify the second location receiving the reflected light based on a date.

The memory may further store instructions executable by the processor to identify a surface reflecting the reflected light and to actuate a suspension system of the vehicle to direct a solar panel of the vehicle towards the surface reflecting the reflected light.

The memory may further store instructions executable by the processor to compare an output of a solar panel of the vehicle at the second location receiving the reflected light with a threshold amount of output, and to identify a third location receiving reflected light upon a determination that the output of the solar panel of the vehicle at the second location receiving the reflected light is less than the threshold amount of output.

The memory may further store instructions executable by the processor to identify the threshold based on the output of the solar panel of the vehicle at the second location at a first time, and to compare the output of the solar panel of the vehicle at the second location with the threshold at a second time that is after the first time.

The memory may further store instructions executable by the processor to identify the second location receiving the reflected light upon a determination that a charge level of the vehicle is below a threshold.

A method includes identifying, in a vehicle at a first location, a second location receiving reflected light. The method includes navigating the vehicle from the first location to the second location receiving the reflected light.

The method may include identifying the second location receiving the reflected light based on a location of a building.

The method may include identifying the location of the building based on data from a sensor supported by the vehicle.

The method may include identifying the second location receiving the reflected light based on an orientation of an exterior surface of the building.

The method may include identifying the second location receiving the reflected light based on a time of day.

The method may include identifying the second location receiving the reflected light based on a date.

The method may include identifying a surface reflecting the reflected light and actuating a suspension system of the vehicle to direct a solar panel of the vehicle towards the surface reflecting the reflected light.

The method may include identifying the surface reflecting the reflected light based on data from a sensor supported by the vehicle.

The method may include comparing an output of a solar panel of the vehicle at the second location receiving the reflected light with a threshold, and identifying a third location receiving reflected light upon a determination that the output of the solar panel of the vehicle at the second location receiving the reflected light is less than the threshold.

The method may include determining the threshold based on the output of the solar panel of the vehicle at the second location at a first time, and comparing the output of the solar panel of the vehicle at the second location with the threshold at a second time that is after the first time.

The method may include identifying the second location receiving the reflected light upon a determination that a charge level of the vehicle is below a threshold.

The method may include identifying the second location receiving the reflected light based on a position of the sun.

The second location may be within a threshold range of the first location.

A computer may be programmed to perform the method.

A computer readable medium may store program instructions executable by a computer processor to perform the method.

With reference to the Figures, a problem of increasing efficiency, e.g., maximizing or optimizing, a charge rate of a vehicle 20 having a solar panel 22 is addressed in a system 23 that includes a computer 24 having a processor and a memory, the memory storing instructions executable by the processor to identify, in the vehicle 20 at a first location, a second location receiving reflected light, sometimes referred to herein as a "target location." The memory stores instructions executable by the processor to navigate the vehicle 20 from the first location to the second location receiving the reflected light. As also described below, the memory further stores instructions to optimize the collection of light in vehicle 20 solar panel(s) 22.

The term "location" in this disclosure refers, with reference to a vehicle 20, to a physical, i.e., geographic, position of the vehicle on the surface of the earth. Accordingly, a location could be determined in a known manner, e.g., according to geo-coordinates such as are known. For example, global positioning system (GPS) devices can determine latitude and longitude, and could be used to determine locations discussed herein.

As used herein, "reflected light" is light that has been reflected off at least one surface having a high level of solar reflectance, e.g., above 0.6 Albedo.

Vehicle

Figure 1:
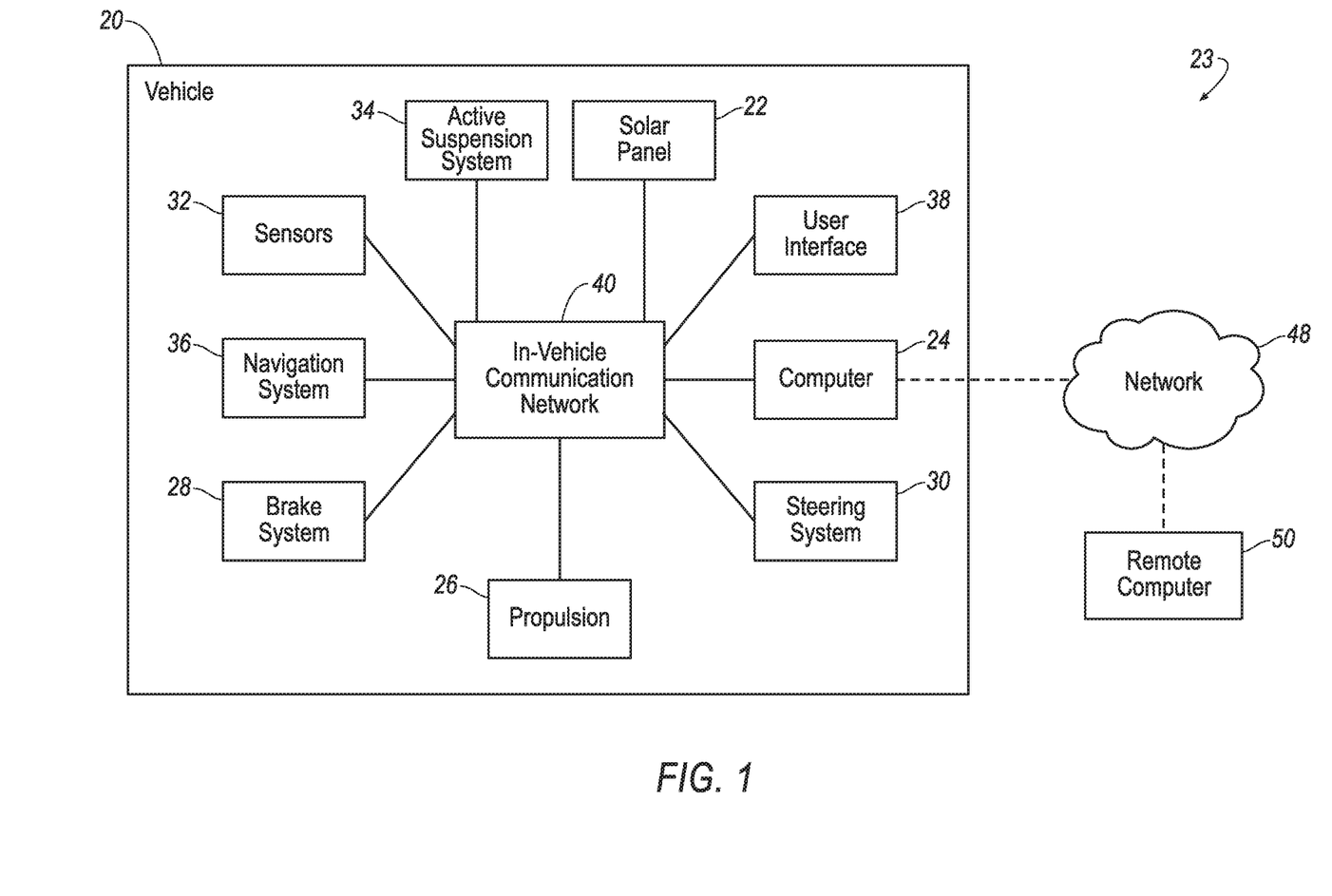
FIG. 1 is a block diagram of components of an example vehicle solar charge system.
Figure 2:
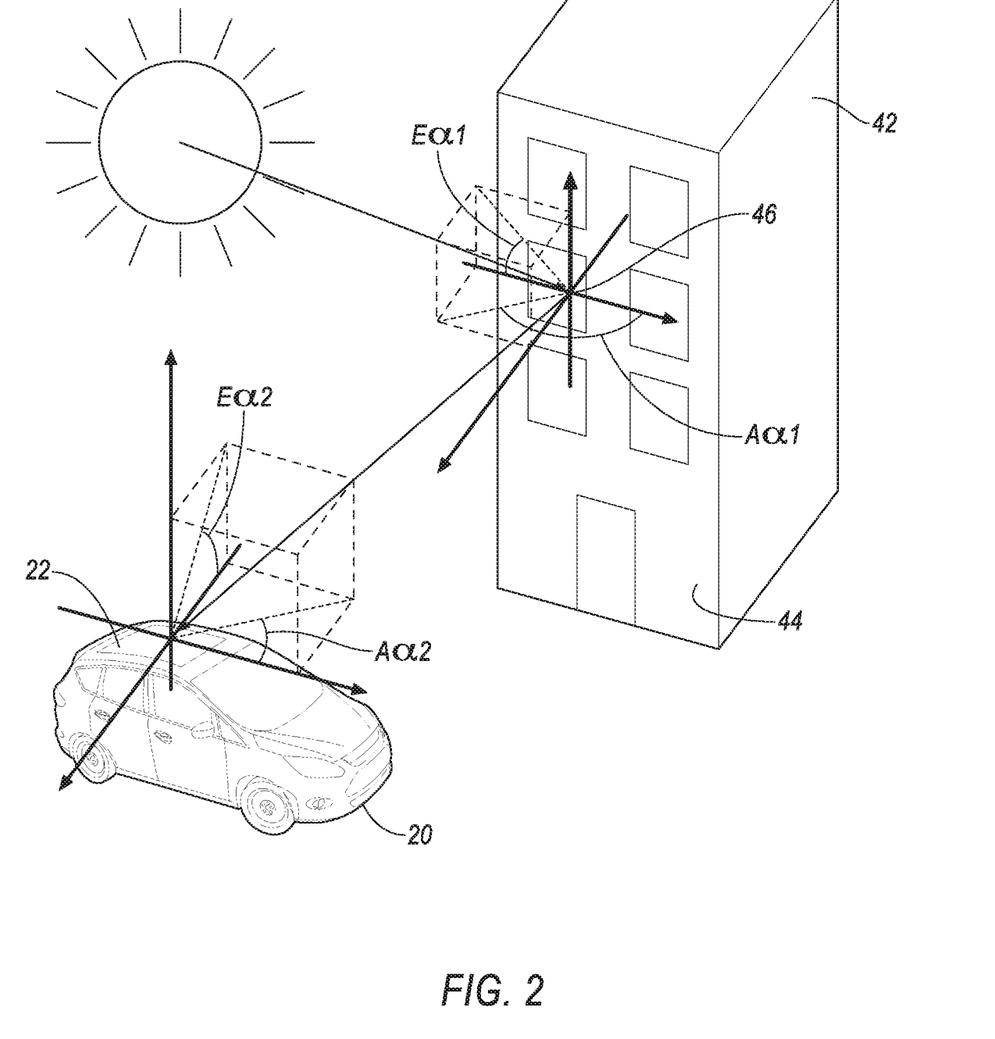
FIG. 2 is a perspective view of an example vehicle included in the vehicle solar charge system of FIG. 1.

The vehicle 20, as illustrated in FIGS. 1 and 2, may be any passenger or commercial automobile such as a car, a truck, a sport utility vehicle, a crossover vehicle, a van, a minivan, a taxi, a bus, etc. The vehicle 20 may operate in an autonomous (e.g., driverless) mode, a semi-autonomous mode, and/or a non-autonomous mode. For purposes of this disclosure, the autonomous mode is defined as one in which each of a propulsion 26, a brake system 28, and a steering system 30 of the vehicle 20 are controlled by one or more vehicle 20 computers 24; in the semi-autonomous mode computer(s) 24 of the vehicle 20 control(s) one or two of the vehicle 20 propulsion 26, brake system 28, and steering system 30; each of these are controlled by a human operator in the non-autonomous mode. The vehicle 20 may additionally include sensors 32, the solar panel 22, an active suspension system 34, a navigation system 36, a user interface 38, and an in-vehicle communication network 40 for providing communication between the vehicle 20 components.

The propulsion 26 of the vehicle 20 can translate stored energy into motion of the vehicle 20. The propulsion 26 may be an electric powertrain including batteries, an electric motor, and a transmission that transfers rotational motion to the wheels; a hybrid powertrain including elements of a conventional powertrain, e.g., an internal-combustion engine coupled to a transmission that transfers rotational motion to wheels, and the electric powertrain; or any other type of propulsion 26 that utilizes stored electric power. The propulsion 26 is in communication with and receives input from the vehicle 20 computer 24 and/or from a human driver. The human driver may control the propulsion 26 via an input device, e.g., an accelerator pedal and/or a gear-shift lever. The propulsion 26 may send data, e.g., describing a charge level of the batteries of the propulsion 26, to the vehicle 20 computer 24 via the in-vehicle communication network 40.

The brake system 28 can be a conventional vehicle 20 subsystem that can resist the motion of the vehicle 20 to thereby slow and/or stop the vehicle 20. The brake system 28 may be friction brakes such as disc brakes, drum brakes, band brakes, etc.; regenerative brakes; a parking brake; any other suitable type of brakes; or a combination. The brake system 28 can include an electronic control unit (ECU) or the like that actuates the brake system 28 to resist the motion of the vehicle 20, e.g., in response to a command from the vehicle 20 computer 24 and/or from a human driver. The human driver may control the brake system 28 via an input device, e.g., a brake pedal.

The steering system 30 is typically a conventional vehicle 20 steering subsystem and controls the turning of the wheels. The steering system 30 is in communication with and receives input from a steering wheel and/or the vehicle 20 computer 24. The steering system 30 may be a rack-and-pinion system with electric power-assisted steering, a steer-by-wire system, as are both known in the art, or any other suitable system.

The vehicle 20 sensors 32 may detect internal states of the vehicle 20, for example, wheel speed, wheel orientation, tire pressure, suspension travel, brake sensors, traction control sensors, and engine and transmission variables. The vehicle 20 sensors 32 may detect the position or orientation of the vehicle 20, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The vehicle 20 sensors 32 may detect the external world, for example, light measurement sensors, photometers, microphones, wind speed measurement sensors, radar sensors, scanning laser range finders, light detection and ranging (LIDAR) devices, and image processing sensors such as cameras.

The solar panel 22 can output electricity generated from light received by the solar panel 22. The solar panel 22 may include one or more photovoltaic solar cells. The solar panel 22 may be supported by a roof of the vehicle 20, or any other suitable component of the vehicle 20, e.g., permitting the solar panel 22 to receive light from outside the vehicle 20. The solar panel 22 is in communication with the batteries of the propulsion 26, or other device for storing electricity, e.g., such that electricity generated by the solar panel 22 may be stored. The solar panel 22 is in communication with the computer 24, e.g., such that the computer 24 may identify an amount of energy, e.g., in volts, being output by the solar panel 22. For example, the solar panel 22 may include a voltage sensor in communication with the computer 24, e.g., via the in-vehicle communication network 40, and configured to measure the voltage output of the solar panel 22. As an alternative to being a component of the solar panel 22, the voltage sensor may be supported elsewhere by the vehicle 20.

The active suspension system 34 can be a conventional vehicle 20 suspension subsystem that controls vertical movement of wheels of the vehicle 20 relative to a body of the vehicle 20, e.g., to absorb impact of bumps, potholes and other elevation changes of a road surface encountered by the vehicle 20, to adjust a ride height of the vehicle 20, etc. The active suspension system 34 may include springs, piston and cylinder arrangements, linear actuators, fluid pumps, circuits and chips, etc. The active suspension system 34 may individually adjust the ride height of each wheel of the vehicle 20, e.g., in response to an instruction from the computer 24.

The vehicle 20 navigation system 36 can determine a location and orientation, e.g., a compass heading direction, of the vehicle 20 according to map data, e.g., by geocoordinates and compass heading direction that can be used to determine the vehicle 20 location and orientation on a map. The map data may specify locations covered by roads as well as data about road and locations adjacent and/or proximate to roads, such as a number of lanes of a road, direction(s) of travel of lanes, parking lot locations, etc. The map data typically further includes locations of buildings 42 and information regarding an exterior surface 44 of such buildings 42. The information regarding the exterior surface 44 may include facing directions, i.e., orientations of one or more planes of the exterior surface 44, e.g., compass heading and angle with respect to the horizon (e.g., azimuth and elevation angles as discussed below), the angle with respect to the horizon possibly being zero, indicating that the surface 44 is perpendicular to the horizon, or greater than or less than zero, and reflectance of the exterior surface 44. The vehicle 20 navigation system 36 may rely on information from a global navigation satellite system, distance data from vehicle 20 sensors 32 attached to a drivetrain of the vehicle 20, e.g., a gyroscope, an accelerometer, a magnetometer, and/or other vehicle 20 sensors 32. The map data may be stored locally, such as in the vehicle 20 computer 24 memory (discussed below), in the vehicle 20 navigation system 36, etc., and/or remotely, such as in a remote computer 50. Exemplary vehicle 20 navigation systems 36 include one or more of known GPS (global positioning system) navigation devices, personal navigation devices, and automotive navigation systems 36.

The user interface 38 presents information to and receives information from an occupant of the vehicle 20. The user interface 38 may be a human-machine interface (HMI) such as presently known for vehicles and may be located, e.g., on an instrument panel in a passenger cabin of the vehicle 20, or wherever may be readily seen by the occupant. The user interface 38 may include dials, digital readouts, screens such as a touch-sensitive display screen, speakers, and so on for providing information to the occupant, e.g., HMI elements. The user interface 38 may include buttons, knobs, keypads, microphones, and so on, for receiving information from the occupant.

The in-vehicle communication network 40 includes hardware, such as a communication bus, for facilitating communication among vehicle 20 components. The in-vehicle communication network 40 may facilitate wired or wireless communication among the vehicle 20 components in accordance with a number of communication protocols such as controller area network (CAN), Ethernet, WiFi, Local Interconnect Network (LIN), and/or other wired or wireless mechanisms.

The vehicle 20 computer 24, implemented via circuits, chips, antennas and/or other electronic components, is included in the vehicle 20 for carrying out various operations and processes, including those described herein. The vehicle 20 computer 24 is a computing device that generally includes a processor and a memory, the memory including one or more forms of computer-readable media, and storing instructions executable by the processor for performing various operations and processes, including those disclosed herein. The vehicle 20 computer 24 may be programmed by storing instructions on the memory that are executable by the processor.

The memory of the vehicle 20 computer 24 further generally stores remote data received via various communications mechanisms; e.g., the vehicle 20 computer 24 is generally configured for communications with vehicle 20 components on the in-vehicle communication network 40, e.g., a controller area network (CAN) bus, and for using other wired or wireless protocols to communicate with devices outside the vehicle 20, e.g., Universal Serial Bus (USB), Bluetooth®, IEEE 802.11 (colloquially referred to as WiFi®), satellite telecommunication protocols, and cellular protocols such as 3G, LTE, etc. Via the in-vehicle communication network 40 the vehicle 20 computer 24 may transmit messages to various devices in the vehicle 20 and/or receive messages from the various devices, e.g., the propulsion 26, the brake system 28, the steering system 30, the sensors 32, etc., e.g., as discussed herein. Although one vehicle 20 computer 24 is shown for ease of illustration, it is to be understood that the vehicle 20 computer 24 could include, and various operations described herein could be carried out by, one or more computing devices.

The vehicle 20 computer 24 may be programmed to determine whether a charge level of the vehicle 20, e.g., of batteries of the propulsion 26, is above a threshold, e.g., 90%. For example, the threshold may be stored in the memory of the vehicle 20 computer 24, e.g., upon manufacturer of the vehicle 20. The threshold may be provided to the vehicle 20 computer 24, e.g., via the user interface 38. The vehicle 20 computer 24 may identify the charge level of the propulsion 26, e.g., in a known manner based on data received from the propulsion 26 via the in-vehicle communication network 40.

The vehicle 20 computer 24 may be programmed to identify a current location of the vehicle 20, e.g., based on information received from the navigation system 36.

The vehicle 20 computer 24 may be programmed to identify locations of one or more buildings 42, e.g., based on map data, based on information received from the remote computer 50 via a wide area network 48, etc.

The vehicle 20 computer 24 may be programmed to identify the location of the one or more buildings 42 based on data from the sensors 32, e.g., an image sensor such as a camera and/or a LIDAR included in or on the vehicle 20. For example, the computer 24 may analyze image data from the image sensor to identify the location of the one or more buildings 42 using image recognition techniques, e.g., the computer 24 may identify an outline of one or more buildings 42 based on an identification of variations of brightness levels of groups of pixels in the image data, or based on a representation generated from LIDAR data. For example, the one or more buildings 42 may be represented in camera image data by pixels that are less bright than pixels representing a background of the building 42, e.g., representing a sky behind the one or more buildings 42. A border between groups of pixels may be analyzed to identify an outline of the one or more buildings 42.

The computer 24 may be programmed to identify an orientation of the exterior surface 44 of the one or more buildings 42. For example, the orientation of the exterior surface 44 of the one more buildings 42 may be included in the map data. For example, the orientation of the exterior surface 44 of the one more buildings 42 may be received from the remote computer 50. For example, the orientation of the exterior surface 44 of the one or more buildings 42 may be identified based on information from the sensors 32, e.g., image data from the image processing sensor, a representation generated from LIDAR data, etc., may be analyzed using known techniques.

The computer 24 may be programmed to identify a current time of day and/or a date, e.g., using clock and/or calendar data.

The vehicle 20 computer 24 may be programmed to identify a target location, i.e., a location that is receiving reflected light. The vehicle 20 computer 24 may identity the target location based on the current location of the vehicle 20, the locations of the one or more buildings 42, the orientation, e.g. facing direction, of the exterior surface 44 of one of the one or more buildings 42, the time of day, the current date, data received from the remote computer 50, and/or data received from the sensors 32, e.g., the image processing sensor. The target location may be a range of locations, e.g., a range of GPS coordinates. For example, the time of day, date, and location may be used to identify a position of the sun. The position of the sun may provide an angle at which light strikes one of the buildings 42. The angle at which light strikes one of the buildings 42 and the orientation of the exterior surface 44 of such building 42 may be used to calculate a reflection angle of the light from the building 42, e.g., using known triangulation techniques. The reflection angle and the location of the building 42 may be used to identify the target location.

For example, the vehicle 20 computer 24 may limit the identified target location to locations within a threshold range, e.g., within 2 miles, of the current location of the vehicle 20.

For example, the vehicle 20 computer 24 may identify a position of the sun, e.g., based on the current location of the vehicle 20, the time, and the date. For example, the vehicle 20 computer 24 may store a lookup table including various positons of the sun associated with various locations, time ranges, dates ranges, etc. For example, the time of day and the date may associated with an azimuth angle $A\alpha 1$ and an elevation angle $E\alpha 1$, as shown in FIG. 2. The azimuth angle $A\alpha 1$ may be a compass heading direction, and the elevation angle $E\alpha 1$ may be an angular measurement relative to the horizon. The azimuth angle $A\alpha 1$ and the elevation angle $E\alpha 1$ for the position of the sun will be substantially the same at the various locations discussed herein. To put it another way, because the distance between the various locations discussed herein is negligible, i.e. practically zero, compared to a distance between such locations and the sun and/or compared to a curvature of the earth, the position of the sun does not depend on which location (of the ground locations discussed herein) is used to identify the position of the sun.

The vehicle 20 computer 24 may identify the position of the sun relative to the vehicle 20 and potential nearby charging locations based on information from the sensors 32, e.g. the image sensor. The computer 24 may identify the sun in image data received from such sensors 32. The vehicle 20 computer 24 may identify the sun in such image data by identifying pixels with a brightness above a threshold, e.g., above a pixel value of 210 on a grayscale pixel value range of 0-255. The vehicle 20 computer 24 may then identify the position of the sun based on the identified pixels in the image and based on a compass heading of the vehicle 20, e.g., as identified by and received from navigation system 36.

The vehicle 20 computer 24 may use the identified position of the sun, the location of the one or more buildings 42, the orientation of the exterior surface 44 of the one more buildings 42, etc., to identify the target location for recharging, e.g., via triangulation techniques. For example, the vehicle 20 computer 24 may determine where light will be reflected based on the azimuth and elevation angles $A\alpha 1$, $E\alpha 1$, and the orientation of the exterior surface 44, as shown in FIG. 2.

For example, the vehicle 20 computer 24 may identify the target location as being on an east side of the one or more buildings 42 when the time is before noon, and as being on a west side of the one or more buildings 42 when the time is after noon.

The vehicle 20 computer 24 may be programmed to identify the target location, i.e., a location receiving the reflected light upon a determination that the charge level of the vehicle 20, e.g., of batteries of the propulsion 26, is below a threshold, e.g., 80%, 290 volts, etc. For example, the vehicle 20 computer 24 may first identify the charge level based on data received from the propulsion 26 and/or the sensors 32, e.g., via the in-vehicle communication network 40. The vehicle 20 computer 24 may then compare the charge level with the threshold. The threshold may be stored on the memory of the vehicle 20 computer 24 at manufacture of the vehicle 20, provided to the vehicle 20 via the user interface 38, etc.

The vehicle 20 computer 24 may be programmed to identify a surface 46 reflecting the reflected light that is received at a specific target location. The vehicle 20 computer 24 may identify the surface 46 reflecting light based on information from the sensors 32, e.g. the image processing sensor, based on the location of the vehicle 20, e.g., when the vehicle 20 is at the target location, based on the position of the sun, based on the location of the one or more buildings 42, based on the orientation of the exterior surface 44 of the one more buildings 42, etc.

For example, the vehicle 20 computer 24 may identity pixels in the image data received from the image processing sensor above a brightness threshold, e.g., above a pixel value of 230. The vehicle 20 computer 24 may identify an azimuth angle $A\alpha 2$ and an elevation angle $E\alpha 2$ toward the surface 46 reflecting the reflected light relative to the location of the vehicle 20, e.g., based on a position of the identified pixels. For example, a top to bottom position of the identified pixels in the image data may be used to identity the elevation angle $E\alpha 2$. For example, a left to right position of the identified pixels in the image data and the orientation of the vehicle 20 may be used to identify the azimuth angle $A\alpha 2$.

For example, the vehicle 20 computer 24 may identify the surface 46 reflecting the reflected light based on the location of the vehicle 20, the position of the sun, the location of the one or more buildings 42, and the orientation of the exterior surface 44 of the one more buildings 42, e.g., via triangulation using angular analysis methods and techniques.

The vehicle 20 computer 24 may be programmed to actuate the active suspension system 34 of the vehicle 20 to direct the solar panel 22 of the vehicle 20 towards the surface 46 reflecting the reflected light. The vehicle 20 computer 24 may actuate the active suspension system 34 to direct the solar panel 22 by sending an instruction to the active suspension system 34 via the in-vehicle communication network 40. The instruction may be to actuate the active suspension system 34 to raise or lower portions of the body. For example, when the surface 46 reflecting the reflected light is identified as being in front of the vehicle 20, the vehicle 20 computer 24 may instruct the active suspension system 34 to lower a front of the vehicle 20 body and to raise a rear of the vehicle 20 body, thereby orienting the solar panel 22 to receive light from in front of the vehicle 20. For example, when the surface 46 reflecting the reflected light is identified as being to a side of the vehicle 20, the vehicle 20 computer 24 may instruct the active suspension system 34 to lower a side of the vehicle 20 body closest to the surface 46 reflecting light and to raise a side of the vehicle 20 body farthest from the surface 46 reflecting light. For example, the instruction may be to actuate the active suspension system 34 such that the azimuth angle $A\alpha 2$ and the elevation angle $E\alpha 2$ toward the surface 46 reflecting the reflected light relative to the location of the vehicle 20 are normal to the solar panel 22. For example, the solar panel 22 may be supported substantially horizontally relative to the horizon on the roof of the vehicle, i.e., a normal vector from the solar panel 22 before actuating the active suspension 34 may have an elevation angle of 90 degrees and no azimuth angle. The azimuth angle $A\alpha 2$ may be compared to the orientation of the vehicle 20 to identity an azimuth angle relative to the vehicle 20. The instructions to the active suspension 34 may instruct the active suspension system 34 to angle the vehicle 20 body such that the normal vector is as close as possible (i.e., based on constraints of the suspension system 34) to the elevation angle $E\alpha 2$ and the azimuth angle relative to the vehicle 20. For example, if the vehicle 20 is oriented in a north direction and the azimuth angle $A\alpha 2$ indicates light is coming from a south, the active suspension system 34 may raise the front of the vehicle 20 and lower the rear of the vehicle 20, the amount of such raising and lowering in direct proportion to the elevation angle Eα2, e.g., the lower the elevation angle Eα2 the less the front will be raised and the rear will be lowered.

The vehicle 20 computer 24 may be programmed to compare an output of the solar panel 22 of the vehicle 20 with a threshold amount of output, e.g., 200 volts. The vehicle 20 computer 24 may identify the output of the solar panel 22 based on information received from the solar panel 22, from the sensors 32, etc., e.g., via the in-vehicle communication network 40. The threshold amount of output may be stored on the memory of the vehicle 20 computer 24. The vehicle 20 computer 24 may identify the threshold based on the output of the solar panel 22 of the vehicle 20 at a time prior to performing the comparison. For example, the vehicle 20 computer 24 may identify the output of the solar panel 22 upon arriving at the target location, upon actuating the active suspension system 34, etc. For example, the vehicle 20 computer 24 may identify the threshold as being a certain amount less, e.g., 10%, 20 volts, etc., than the output of the solar panel 22 upon arriving at the target location, upon actuating the active suspension system 34, etc.

The vehicle 20 computer 24 may be programmed to navigate the vehicle 20 to a location. For example, the vehicle 20 computer 24 may transmit actuation instructions to the propulsion 26, the brake system 28, and the steering system 30, e.g., via the in-vehicle communication network 40, e.g., based on information received from the navigation system 36, the sensors 32, etc.

Wide Area Network

The network 48 (sometimes referred to as a wide area network because it can include communications between devices that are geographically remote from one another, i.e., not in a same building, vehicle 20, etc.,) represents one or more mechanisms by which remote devices, e.g., the vehicle 20 computer 24, the remote computer 50, etc., may communicate with each other. Accordingly, the network 48 may be one or more wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks 48 include wireless communication networks (e.g., using Bluetooth, IEEE 802.11, etc.), local area networks (LAN) and/or wide area networks (WAN), including the Internet, providing data communication services.

Remote Computer

The remote computer 50 may be one or more computers remote from the vehicle 20, each generally including at least one processor and at least one memory, the memory storing instructions executable by the processor, including instructions for carrying out various steps and processes described herein. The remote computer 50 may be programmed by storing instructions on the memory that are executable by the processor. The remote computer 50 may include or be communicatively coupled to a data store for storing collected data.

The remote computer 50 may be programmed to communicate with the vehicle 20 computer 24, e.g., via the network 48. The remote computer 50 may receive information from the vehicle 20 computer 24, e.g., the location of the vehicle 20, information from vehicle 20 sensors 32, etc. The remote computer 50 may transmit information to the vehicle 20 computer 24, e.g., map data, the location of one or more buildings 42, the orientation of the exterior surface 44 of one of the one or more buildings 42, the position of the sun, the target location, etc.

The remote computer 50 may be programmed to identify the target location, as described herein.

The remote computer 50 may be programmed to identify the position of the sun, as described herein.

Process

Figure 3:
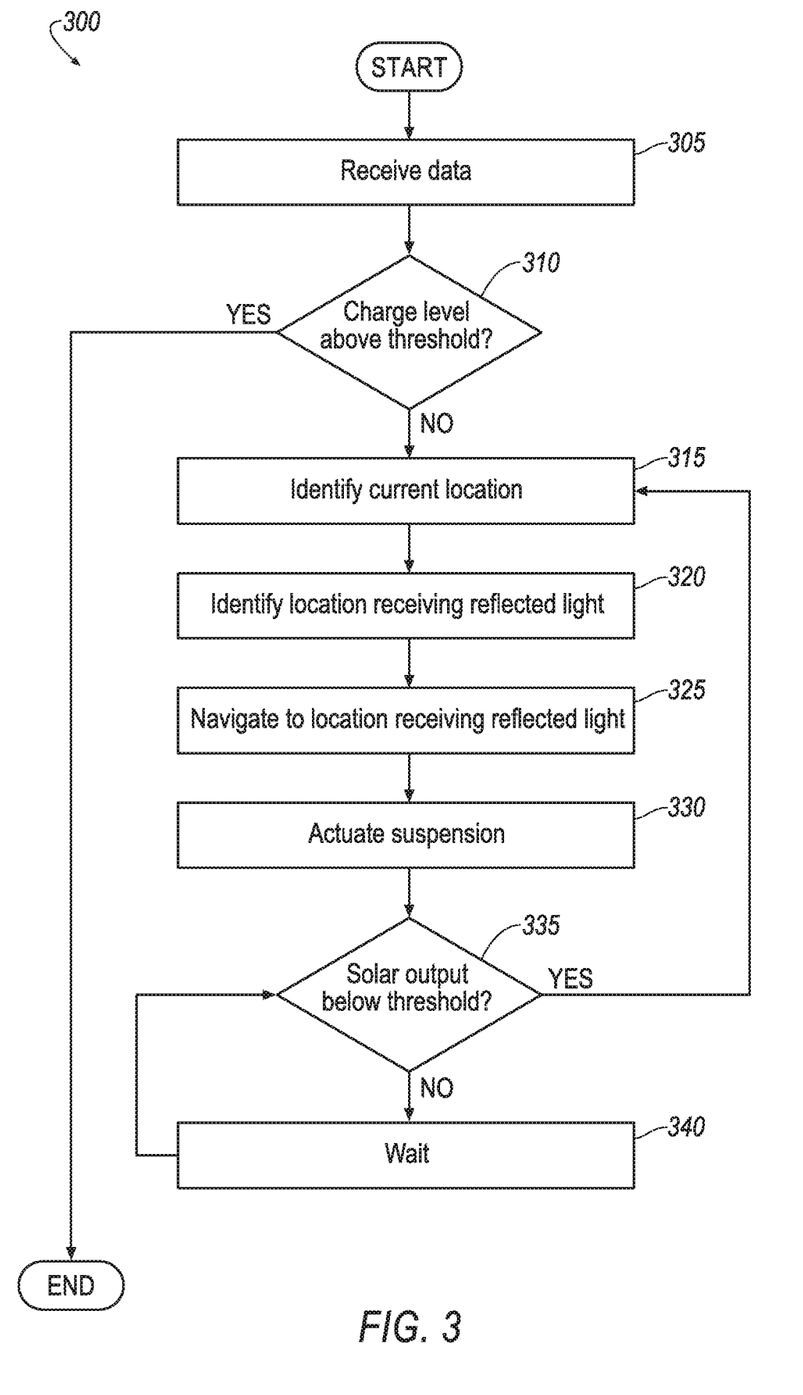
FIG. 3 is a flow chart of an example process of controlling the vehicle solar charge system of FIG. 1.

FIG. 3 is a process flow diagram illustrating an exemplary process 300 for optimizing or improving efficiency of a solar charge rate of a vehicle 20. The process 300 may be executed according to instructions stored in and executable by the vehicle 20 computer 24.

The process 300 begins in a block 305 in which the vehicle 20 computer 24 receives data from components of the vehicle 20, e.g., the solar panel 22, the propulsion 26, the sensors 32, the navigation system 36, etc., e.g., via the in-vehicle communication network 40. The vehicle 20 computer 24 may continue to receive data throughout the process 300. Throughout the process 300 means substantially continuously or at time intervals, e.g., every 200 milliseconds.

Next, at a block 310 the vehicle 20 computer 24 determines whether the charge level of the vehicle 20, e.g., of the batteries of the propulsion 26, are above the threshold, e.g., based on information received from the propulsion 26, as described above. Upon a determination that the charge level is above the threshold, the process 300 may end. Alternately, the process 300 may return to the block 305. Upon a determination that the charge level is not above the threshold the process 300 moves to a block 315. The vehicle 20 computer 24 may continue to execute the block 310 throughout the process 300.

At the block 315 the vehicle 20 computer 24 identifies a current location of the vehicle 20, e.g., based on information received from the navigation system 36, as described herein.

Next, at a block 320 the vehicle 20 computer 24 identifies the target location, e.g., based on the current location of the vehicle 20, the locations of the one or more buildings 42, the orientation of the exterior surface 44 of one of the one or more buildings 42, the time of day, the current date, data received from the remote computer 50, and/or data received from the sensors 32, e.g., the image processing sensor, as described above. The vehicle 20 computer 24 may receive the identification of the target location from the remote computer 50, e.g., via the network 48.

Next, at a block 325 the vehicle 20 computer 24 navigates the vehicle 20 to the target location, e.g., by sending instructions to the propulsion 26, the brake system 28, the steering system 30 based on information received from the navigation system 36 and the sensors 32, as described above.

Next, at a block 330 the vehicle 20 computer 24 instructs the active suspension system 34 to actuate to direct the solar panel 22 toward the surface 46 reflecting light, as described herein. The vehicle 20 computer 24 may instruct such actuation upon arriving at the target location.

Next, at a block 335 the vehicle 20 computer 24 determines whether the output of the solar panel 22 is below the threshold, e.g., based on information received from the solar panel 22, the sensors 32, etc., as described herein. Upon a determination that the output is not below the threshold, the process moves to a block 340. Upon a determination that the output is below the threshold, the process 300 returns to the block 320, e.g., to identify another target location, then to navigate to such location, etc.

At the block 340, the vehicle 20 computer 24 waits an amount of time, e.g., five minutes. While the vehicle 20 computer 24 is waiting, the vehicle 20 may receive a charge, e.g. from the output of the solar panel 22, the vehicle 20 computer 24 may continue to receive data from components of the vehicle 20, etc. After waiting the amount of time, the process 300 returns to the block 335.

Conclusion

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The article "a" modifying a noun should be understood as meaning one or more unless stated otherwise, or context requires otherwise. The phrase "based on" encompasses being partly or entirely based on.

What is claimed is:

1. A system, comprising a processor; and a memory, the memory storing instructions executable by the processor to:
   receive, in a vehicle at a first location, data from at least one of a sensor or a computer remote from the vehicle, the data indicating a location of a reflective surface;
   identify, based on the data indicating the location of the reflective surface, a second location receiving reflected light from the reflective surface; and
   navigate the vehicle from the first location to the second location receiving the reflected light from the reflective surface.

2. The system of claim 1, wherein the reflective surface is a surface of a building.

3. The system of claim 1, wherein the sensor is supported by the vehicle.

4. The system of claim 2, wherein the data from the sensor or remote computer indicates an orientation of the surface of the building, and wherein the memory further stores instructions executable by the processor to identify the second location receiving the reflected light based on the orientation of the surface of the building.

5. The system of claim 1, wherein the memory further stores instructions executable by the processor to identify the second location receiving the reflected light based on a time of day.

6. The system of claim 1, wherein the memory further stores instructions executable by the processor to identify the second location receiving the reflected light based on a date.

7. The system of claim 1, wherein the memory further stores instructions executable by the processor to identify the reflective surface based on image data received from the sensor, and to actuate a suspension system of the vehicle to direct a solar panel of the vehicle towards the reflective surface.

8. The system of claim 1, wherein the memory further stores instructions executable by the processor to compare an output of a solar panel of the vehicle at the second location receiving the reflected light with a threshold amount of output, and to identify a third location receiving reflected light upon a determination that the output of the solar panel of the vehicle at the second location receiving the reflected light is less than the threshold amount of output.

9. The system of claim 8, wherein the memory further stores instructions executable by the processor to identify the threshold based on the output of the solar panel of the vehicle at the second location at a first time, and to compare the output of the solar panel of the vehicle at the second location with the threshold at a second time that is after the first time.

10. The system of claim 1, wherein the instructions include instructions to receive image data specifying pixel values from the sensor, and to identify the reflective surface based on the pixel values.

11. A method, comprising:
    receiving, by a computer having a processor and a memory in a vehicle at a first location, data from at least one of a sensor or a computer remote from the vehicle, the data indicating a location of a reflective surface;

identifying, with the computer and based on the data indicating the location of the reflective surface, a second location receiving reflected light; and navigating the vehicle from the first location to the second location receiving the reflected light from the reflective surface.

12. The method of claim 11, wherein the reflective surface is a surface of a building.

13. The method of claim 12, wherein the sensor is supported by the vehicle.

14. The method of claim 12, wherein the data from the sensor or remote computer indicates an orientation of the surface of the building, and further comprising identifying the second location receiving the reflected light based on the orientation of the surface of the building.

15. The method of claim 11, further comprising identifying the second location receiving the reflected light based on a time of day.

16. The method of claim 11, further comprising identifying the second location receiving the reflected light based on a date.

17. The method of claim 11, further comprising identifying the reflective surface based on image data received from the sensor, and actuating a suspension system of the vehicle to direct a solar panel of the vehicle towards the reflective surface.

18. The method of claim 11, further comprising comparing an output of a solar panel of the vehicle at the second location receiving the reflected light with a threshold, and identifying a third location receiving reflected light upon a determination that the output of the solar panel of the vehicle at the second location receiving the reflected light is less than the threshold.

19. The method of claim 18, further comprising determining the threshold based on the output of the solar panel of the vehicle at the second location at a first time, and comparing the output of the solar panel of the vehicle at the second location with the threshold at a second time that is after the first time.

20. The method of claim 11, further comprising receiving image data specifying pixel values from the sensor, and identifying the reflective surface based on the pixel values.

* * * * *